UNITED STATES PATENT OFFICE.

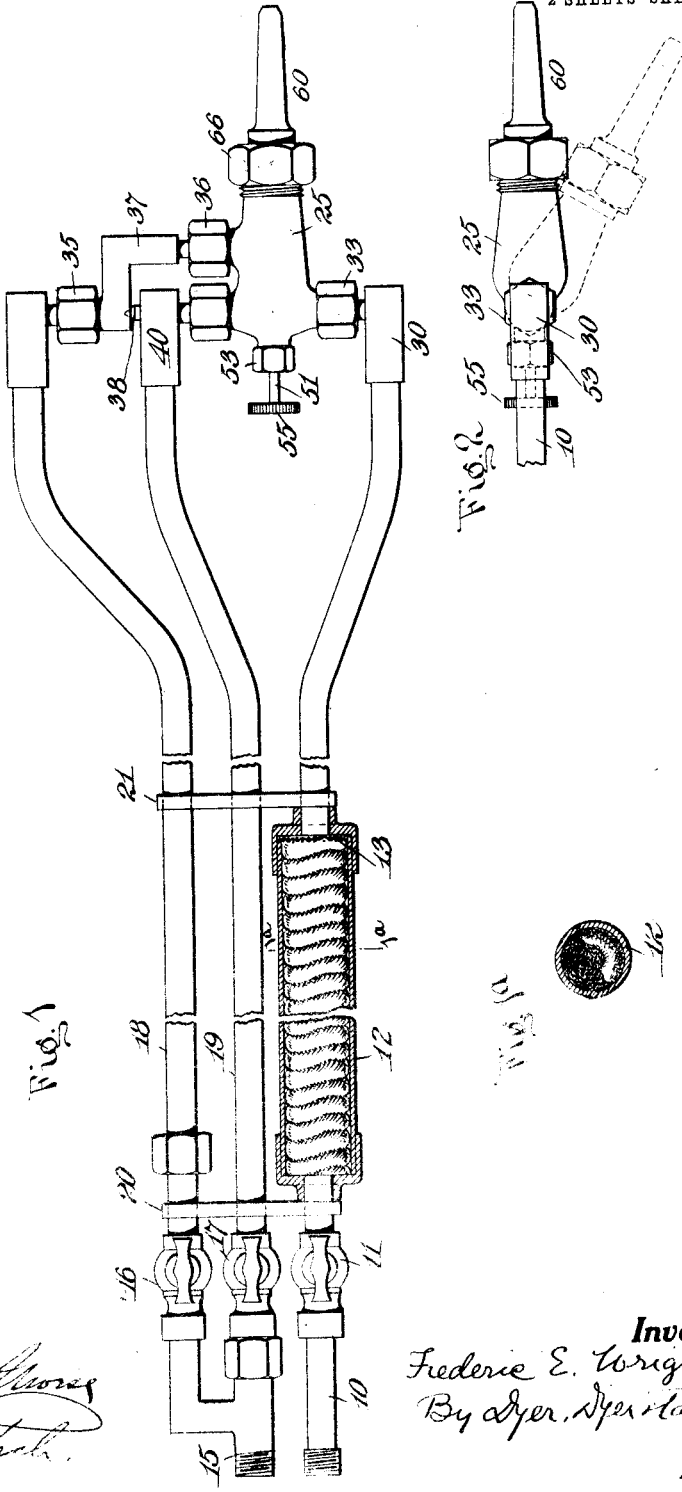

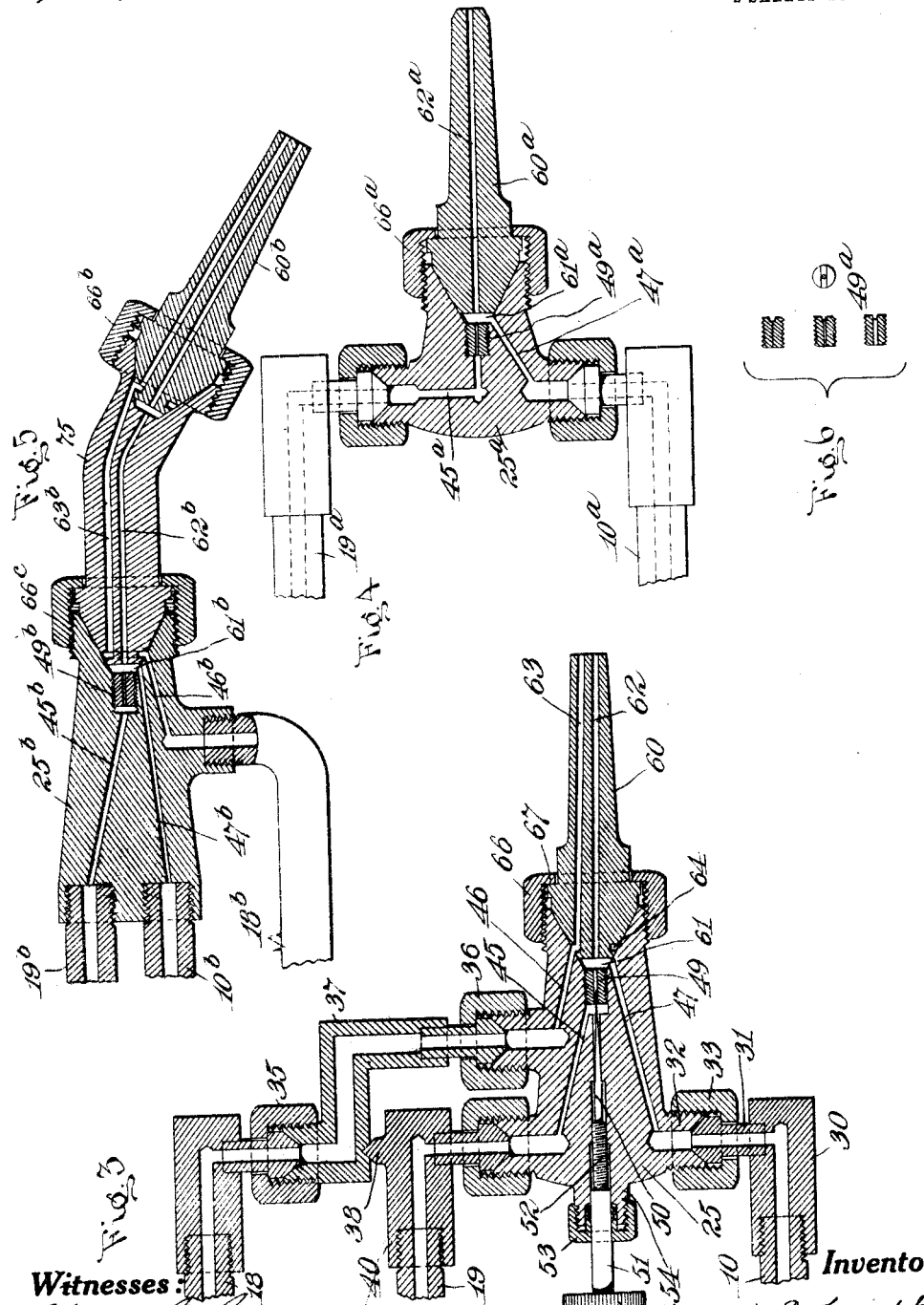

FREDERIC E. WRIGHT, OF RICHMOND HILL, NEW YORK.

TORCH.

1,060,393.

Specification of Letters Patent.  Patented Apr. 29, 1913.

Application filed January 27, 1911. Serial No. 604,972.

*To all whom it may concern:*

Be it known that I, FREDERIC E. WRIGHT, a citizen of the United States, residing at Richmond Hill, Long Island, county of Queens, and State of New York, have invented new and useful Improvements in Torches, of which the following is a specification.

My invention relates to burners, blowpipes or torches and is particularly useful in connection with metal fusing and cutting torches in which are employed some fuel gas such as acetylene, hydrogen, coal gas, etc., and some gas which supports combustion, such as oxygen. Torches of this type are extensively used for the purpose of fusing two metal parts together or for cutting a metal apart. It is, however, to be understood that my invention is not limited to employment in this connection since many features thereof are applicable to other kinds of burners and torches.

Among the general objects of my invention are the provision of a device of the kind above mentioned which is simple and cheap in construction, efficient and economical in operation, and durable and safe in use.

My invention will be fully understood and further objects thereof will appear from consideration of the embodiments thereof set forth in the following specification and accompanying drawings, taken together or separately.

In the drawings, Figure 1 is a plan view, partly in section, of a fusing and cutting torch having my invention embodied therein; Fig. 1ª is a section on the line 1ª—1ª of Fig. 1; Fig. 2 is a side elevation of the nozzle end of the torch, showing the manner in which the nozzle can be adjusted to aim in different directions; Fig. 3 is a plan view, in cross-section on an enlarged scale, of the nozzle end of the torch shown in Fig. 1; Fig 4 is a plan view partly in section, illustrating the nozzle end of a welding torch built in accordance with my invention; Fig. 5 is a sectional plan view of a welding and cutting torch constructed in accordance with my invention, illustrating a modified arrangement for permitting the aim of the nozzle to be adjusted; and Fig. 6 shows bushings with different sized holes therethrough, adapted for use in the embodiments of my invention shown in the other figures.

Like parts are referred to throughout the several views by the same reference characters.

The torches illustrated in the drawings and hereinafter described are adapted for use with oxygen and acetylene.

Referring to Fig. 1, the handle portion of the torch is shown as comprising a plurality of conduits or pipes through which the oxygen and acetylene pass to the nozzle of the torch. The acetylene is furnished from a suitable source of supply through a hose connected to a pipe 10 which has interposed therein a controlling valve 11, and a cylindrical enlargement 12 which serves as a safety device to absolutely prevent the flame of the torch from working back into the acetylene feed hose should for any reason this hose become filled with a combustible mixture. The cylinder 12 contains a fine mesh screen 13 located at the end toward the torch nozzle, and is filled with some porous material such, for example, as asbestos packing coiled around itself within the cylinder 12 as shown in Figs 1 and 1ª. I have found that this kind and arrangement of packing is particularly efficacious, and I regard this kind of safety device as one of the new features of my invention. The oxygen supply hose (not shown) is connected to a common connection consisting of a two-way connection 15 which connects through two valves, 16 and 17, with conduits or pipes 18 and 19 which lead to the nozzle of the torch. The pipes 10, 18 and 19 may be connected together in any suitable way to form a handle for the torch, as by means of clips 20 and 21 through which said pipes pass.

The nozzle of the torch illustrated in Figs. 1, 2 and 3, comprises a body portion 25, which is mechanically connected to the pipes 10, 18 and 19 so as to be adjustable thereon to permit variation in the direction of aim of the nozzle. The connections between the body portion 25 of the nozzle and the pipes forming the handle are such that acetylene and oxygen can flow from the latter to passages in said body portion. These connections may be of any suitable form and as illustrated, comprise jointed, pivotal unions between caps on the ends of said pipes and perforated lugs on the sides of said body portion 25. Referring particularly to Fig. 3, the union between the pipe 10 and the nozzle body portion 25 comprises the cap 30 secured to the end of the pipe 10, a perforated lug 31 projecting from said cap at right angles and provided with a beveled head, a perforated lug 32 projecting from the body portion 25, and a nut 33 which screws upon the outside of the lug 32 and has an internal shoulder which coöperates with a shoulder upon the lug 31 and thus serves to draw the beveled head of the lug 31 into snug engagement with a seat formed in the end of the lug 32. A tight joint is thus provided between the pipe 10 and the nozzle; while at the same time pivotal movement is permitted by slipping between the conical surfaces of the lugs 31 and 32, the nut 33 being loosened for this purpose if necessary. The connection between the pipe 19 and the body portion 25 of the nozzle is similar to the connection just described, as will be clear from the drawing. And the connection between the pipe 18 and said nozzle is of the same general type, the principal difference being that two unions 35 and 36 are provided, these being connected by an elbow pipe 37 which is pivoted on a lug 38 projecting from the cap 40 on the end pipe 19, as clearly shown. With this arrangement it is obvious that the nozzle will be pivotally supported on the pipes 10, 18 and 19 about an axis passing through the unions attached to the ends of the pipes 10, 18 and 19; and that, when such movement takes place slipping will occur between the conical surfaces of the coöperative members of the unions without leakage of the oxygen or acetylene.

The body portion 25 of the nozzle is provided with oxygen passages 45 and 46 and an acetylene passage 47, arranged as shown, which lead respectively from the unions attached to the pipes, 19, 18 and 10 to a cavity in the end of said body portion 25, said cavity being cone-shaped as shown or of any other suitable shape. In order to provide for regulation of the effective area of the oxygen passage 45, suitable means may be provided such as the needle valve shown in Fig. 3. The seat of said valve may consist of a bushing 49, which may be screwed into a hole in the bottom of the cone-shaped cavity; and the movable member of the valve is shown as comprising a needle 50 extending from a spindle 51 provided with a threaded portion 52 which screws in a threaded hole in the body portion 25. In order to prevent leakage of oxygen around the needle and its spindle, a gland 53 may be arranged, as shown, to screw upon a lug 54 extending from the body portion 25, suitable packing being provided in a well-known manner as shown. Attached to the end of the spindle 51 is a knurled head 55 which facilitates adjustment of the needle valve.

Secured to the body portion of the nozzle is a tip 60, having an end adapted to fit the cone-shaped cavity in said body portion, as shown in Fig. 3. The cone-shaped end of the tip is squared off at such a point that a mixing chamber 61 is formed in the cavity between the bottom thereof and the squared end of the tip. Passing through the tip 60, are a passage 62 for the combustible mixture, and a passage 63 for the oxygen jet used when the torch is employed as a cutting tool. The passage 62 extends from the outer end of the tip to the inner squared end thereof, and thus communicates with the mixing chamber 61. It will be evident from the drawing that the acetylene passage 47 is so arranged that it opens into the mixing chamber 61 with which the oxygen passage 45 also communicates through the hole in the bushing 49. The oxygen passage 46 is so arranged that it communicates with the cone-shaped cavity in the body portion 25, at a point some distance from the bottom thereof; and the passage 63 in the tip extends from the outer end thereof to a point on the cone-shaped inner end which corresponds to the point at which the passage 46 opens into the cavity. The passages 46 and 63, therefore, communicate with one another when the tip 60 is in place, this being assured for all positions of the tip by means of a groove 64 cut in the conical surface of the tip at the point where the passage 63 meets such surface. It is obvious, therefore, that oxygen supplied through the pipe 18 will be furnished through the connection 35, elbow pipe 37, connection 36, and passage 46, to the passage 63 in the tip, without passing through the mixing chamber 61. The tip 60 is held with its cone-shaped end snugly within the cavity in the body portion 25, by means of a nut 66 which screws upon the outer end of the body portion 25, and is provided with an annular lug 67 which coöperates with an annular shoulder on the tip in a manner apparent from Fig. 3.

In Fig. 4 is illustrated a simple form of torch, made in accordance with my invention, having means therein for controlling the size of the opening into the mixing chamber from the oxygen passage, differing from the means for this purpose shown in Figs. 1 to 3. For the sake of simplicity, the nozzle of Fig. 4 is not provided with any passage for an oxygen jet; that is, this nozzle is adapted for a torch which is to be used only for heating, fusing and welding. In this nozzle the form of the body portion 25ª may be as shown, and the connections between said body portion and the oxygen pipe 19ª and the acetylene pipe 10ª may be of the same form as the pivotal connections shown in Figs. 1 to 3 and hereinbefore described. Furthermore, the general form of the tip 60ª and the manner of securing the same to the body portion 25ª by a nut 66ª, may be as in the torch previously described.

The principal difference between the nozzle of Fig. 4 and that of Figs. 1 to 3, resides in the means which is provided for varying the size of the oxygen passage where it enters the mixing chamber 61$^a$. This means comprises a removable bushing 49$^a$ which may be similar to that used in the nozzle of Figs. 1 to 3 for the seat of the needle valve. This bushing 49$^a$ may screw into body portion 25$^a$ at the bottom of the cavity therein, and by having a number of interchangeable bushings with different sized holes therein, as shown in Fig. 6, the operator is enabled to change the effective size of the oxygen passage where it enters the mixing chamber. It will be obvious from an inspection of Fig. 4 that oxygen passing through the oxygen passage 45$^a$ and the hole in the bushing 49$^a$ will mix in the mixing chamber 61$^a$ with the acetylene coming through the passage 47$^a$, and that the combustible mixture will pass out through the passage 62$^a$ in the tip. It is, of course, to be understood that the method of changing the size of the oxygen passage just described, and shown in Fig. 4, is applicable to the nozzle of the kind shown in Fig. 8; that is, if for any reason the needle valve of the previously described nozzle should become inoperative, the bushing 49 may be removed and other bushings, having different sized holes therein substituted, the needle of the needle valve being either removed or screwed back out of operative position.

In Fig. 5 is illustrated a form of nozzle, made in accordance with my invention, in which the body portion, instead of being pivoted on the conduits which form the handle portion of the torch, is rigid with reference thereto. This form of body portion may be employed for torches where change of aim is unnecessary, but in Fig. 5 I have illustrated an auxiliary attachment which permits adjustment of the direction of aim of the mouthpiece with reference to the body portion of the nozzle. In this figure the body portion of the nozzle is indicated at 25$^b$, the oxygen pipes at 19$^b$ and 18$^b$, and the acetylene pipe at 10$^b$, said pipes being screwed into said body portion and leading to oxygen passages 45$^b$ and 46$^b$ and an acetylene passage 47$^b$, as clearly shown in the drawing. In this arrangement, a bushing 49$^b$ is provided, as in the device of Fig. 4, for adjusting the size of the oxygen passage where it enters the mixing chamber. In the torch of Fig. 5 the mouthpiece 60$^b$ is of the same form as that shown in Figs. 1 to 3, but instead of being secured directly to the body portion of the nozzle, it is connected therewith by a bent connection 75, of the form shown. This bent connection at one end is cone-shaped and of the same form as the cone-shaped end of the mouthpiece 60$^b$, and at the other end said connection is formed with a cone-shaped cavity similar to the cavity in the body portion of the nozzle. Two passages 62$^b$ and 68$^b$ extend through the connection 75 and are arranged as shown to coöperate with the passages in the mouthpiece 60$^b$, and serve to connect the last named passages with the mixing chamber 61$^b$ and the oxygen passage 46$^b$. Nuts 66$^b$ and 66$^c$ serve to secure the tip 60$^b$, the connection 75 and the body portion 25$^b$ together, in the same manner that the nut 66 acts in the arrangement of Figs. 1 to 3. It is obvious that with the torch nozzle of Fig. 5, using the bent connection 75, the aim of the nozzle may be adjusted by slightly loosening the nut 66$^c$ and rotating the connection 75 with relation to the nozzle body 25$^b$. Of course, the connection 75 may be made bent to any angle desired, that shown being merely illustrative.

The mode of operation of the torches above described will be understood by those skilled in this art. In these torches, the size of the flame is regulated by varying the effective size of the oxygen passage, either by means of the needle valve or by the use of bushings having holes therein of different sizes; and by, at the same time, using a tip having therein a particular diameter of passage for the combustible mixture. In other words, the size of the flame is controlled by regulating the size of the oxygen passage leading to the mixing chamber and by regulating the diameter of the passage through the tip for the combustible mixture. The size of the oxygen jet of course depends upon the diameter of the oxygen passage in the tip, said passage being made of the proper size and of the proper diameter with relation to the diameter of the passage in that tip for the combustible mixture. With the forms of nozzle before described, the mixing of the oxygen and acetylene in the mixing chamber is very complete, probably owing to the fact that the squared end of the tip forming one of the walls of the mixing chamber is engaged by the inflowing oxygen and acetylene with resultant churning up and mixture of the two gases. With arrangements of this kind, I am enabled to use oxygen at a much lower pressure than is possible with the torches now in use, without the occurrence of "flashing back" or ignition of the mixture in the nozzle. In fact, I am enabled by my invention to employ oxygen and acetylene at substantially equal pressures instead of being required to use oxygen at a much higher pressure than the acetylene, as is the present practice.

In the torches of Figs. 1 to 4 the aim of the nozzle, with reference to the handle portion, may be changed by moving said nozzle on its pivotal connections; and with the nozzle of Fig. 5 the direction of aim may be varied by turning the connection 75, with reference to the body portion 25ᵇ, as explained above. It is further to be noted that, with cutting torches built in accordance with my invention, the oxygen jet issues from the same tip as the flame; and that the position of the oxygen jet, with reference to the flame, can be adjusted as desired simply by rotating the tip in the body portion of the nozzle or in the bent connection in which said tip is supported. This rotation of the tip is permitted by the arrangement of the passages in the body portion or bent connection and in the tip and by the groove in the conical surface of the tip, as explained above. By my invention, therefore, not only is the nozzle of the torch adjustable as to direction of aim, but the relative location of the oxygen jet and the flame can also be regulated; a cutting torch of this kind is, therefore, adapted for convenient use under all conditions of service. It is also to be noted that with the cutting torches above described, but one oxygen supply hose is necessary, this hose being connected to the elbow 15 to which the pipes 18 and 19 are connected through valves 16 and 17 which permit entirely independent regulation of the flow of oxygen in the two pipes. I regard this independent regulation of the oxygen cutting jet and the oxygen for the flame as highly desirable, and I am not aware that it has been before accomplished with a single oxygen supply hose.

What I claim and desire to secure by Letters Patent is:

1. A torch nozzle comprising a body portion, said body portion containing a cavity and an oxygen passage which terminates in the base of such cavity, a removable tip closing said cavity and forming a mixing chamber, a gas tight joint between the body portion and the tip, said tip having passages one for oxygen gas and one for mixed gases, the passage for mixed gases communicating with said cavity, and said body portion also having another oxygen passage communicating with the oxygen passage in the tip and passing through said joint and beyond the mixing chamber.

2. A torch nozzle comprising a body portion, said body portion having a cavity, said cavity having flaring walls; two passages, one for oxygen gas and one for a fuel gas, at least in the body portion and communicating with said cavity; a removable tip, having at least one passage for mixed gases therethrough, said tip being adapted to engage with said flaring walls, but not completely filling the said cavity, to form therein a mixing chamber, in which the aforesaid body passages, for oxygen gas and for a fuel gas, and the tip passage, for mixed gases, communicate.

3. A torch nozzle comprising a body portion, said body portion having a conical cavity; two passages, one for oxygen gas and one for a fuel gas, at least in the body portion and communicating with the said cavity; a removable tip, having at least one passage for mixed gases therethrough, said tip being adapted to enter but not fill the said cavity, to form therein a mixing chamber, in which the aforesaid body passages, for oxygen gas and for a fuel gas, and the tip passage, for mixed gases, communicate.

4. A torch nozzle comprising a body portion, a cavity in said body portion, three passages, two for oxygen gas and one for a fuel gas, in said body portion communicating with said cavity, and a removable tip having two passages, one for oxygen gas and one for mixed gases therethrough and an end adapted to enter but not completely fill said cavity and form at the bottom thereof a mixing chamber with which two of the passages, one for oxygen gas and one for a fuel gas, in said body portion and the tip passage for mixed gases communicate, and passage for mixed gases communicate, and to connect the tip passage for oxygen gas with the other passage for oxygen gas in said body portion independently of said mixing chamber; and a removable bushing, having a hole, and inserted in said body portion at the mouth of the passage for oxygen gas which communicates with said mixing chamber.

5. A cutting torch nozzle having in combination, a body portion; separate passages, for oxygen gas and mixed gases, through said body portion; and a tip rotatively mounted in relation to said body portion, and having at least one passage for oxygen gas and a separate passage for mixed gases located in the same plane as the passage for oxygen gas, said passages for oxygen gas and mixed gases communicating with the body portion passages for oxygen gas and mixed gases irrespective of the rotary position of the tip.

6. A cutting torch nozzle comprising a body portion having therein a plurality of passages for oxygen and a fuel gas; a bent connection rotatably secured to said body portion and having two passages, one for oxygen gas and one for mixed gases therethrough, the passage for the mixed gases communicates with two of the passages, one for oxygen gas and one for a fuel gas, in said body portion and the other, a passage for oxygen gas, communicates with the other passage for oxygen gas in said body portion; and a mouth-piece rotatably attached to said bent connection and having two passages, one for oxygen gas and one for mixed gases therein, each of which connects with a passage for the same respective gas or gases in said bent connection.

7. A cutting torch nozzle comprising a body portion having therein a cavity, a plurality of passages, for oxygen gas and a fuel gas, communicating with said cavity, a bent connection having a plurality of passages, for oxygen gas and mixed gases therethrough adapted to enter but not completely fill said cavity, to form therein a mixing chamber; and a mouth-piece rotatably secured to said bent connection and having passages, for oxygen gas and mixed gases therein, each of which communicates with a passage for the same respective oxygen gas or mixed gases in said connection.

8. In a cutting torch nozzle, a body portion having a passage therein for a fuel gas and a passage for oxygen gas, said passage communicating to form a mixed gas, a separate passage for oxygen gas, a bent connection rotatably secured to said body portion and having a passage for the mixed gas and a passage for the oxygen gas, and a mouth-piece rotatably secured to said connection and having a passage for the mixed gas and a passage for the oxygen gas.

9. A torch nozzle, comprising a body portion, having therein a cavity, said cavity having flaring walls, and passages for oxygen gas and a fuel gas communicating with it, a bent connection rotatably secured to said body portion, having a passage for the mixed gases therethrough, adapted to enter but not completely fill said cavity, to form therein a mixing chamber; and a mouth-piece rotatably secured to said connection, having at least one passage for the mixed gases therethrough.

10. A torch nozzle, comprising a body portion, having therein a conical cavity, passages for oxygen gas and a fuel gas communicating with it, a bent connection rotatably secured to said body portion, and having a passage for the mixed gases therethrough, adapted to enter but not fill said cavity, to form therein a mixing chamber; and a mouth-piece rotatably secured to said connection, having at least one passage for the mixed gases therethrough.

11. A torch nozzle, comprising a body portion, having therein a cavity; said cavity having flaring walls, and passages for oxygen gas and a fuel gas communicating with it, a removable bent connection rotatably secured to said body portion, and having a passage for the mixed gases therethrough, adapted to enter but not completely fill said cavity, to form therein a mixing chamber; and a mouth-piece rotatably secured to said connection having at least one passage for the mixed gases therethrough.

This specification signed and witnessed this 25th day of January, 1911.

FREDERIC E. WRIGHT.

Witnesses:
JOHN L. LOTSCH,
GUSTAV A. SCHELLACH.

Copies of this patent may be obtained for five cents each, by addressing the "Commissioner of Patents, Washington, D. C."